Jan. 19, 1954   S. S. POKORNY   2,666,510
ADJUSTABLE GOVERNOR FOR ACCELERATORS
Filed Sept. 14, 1951
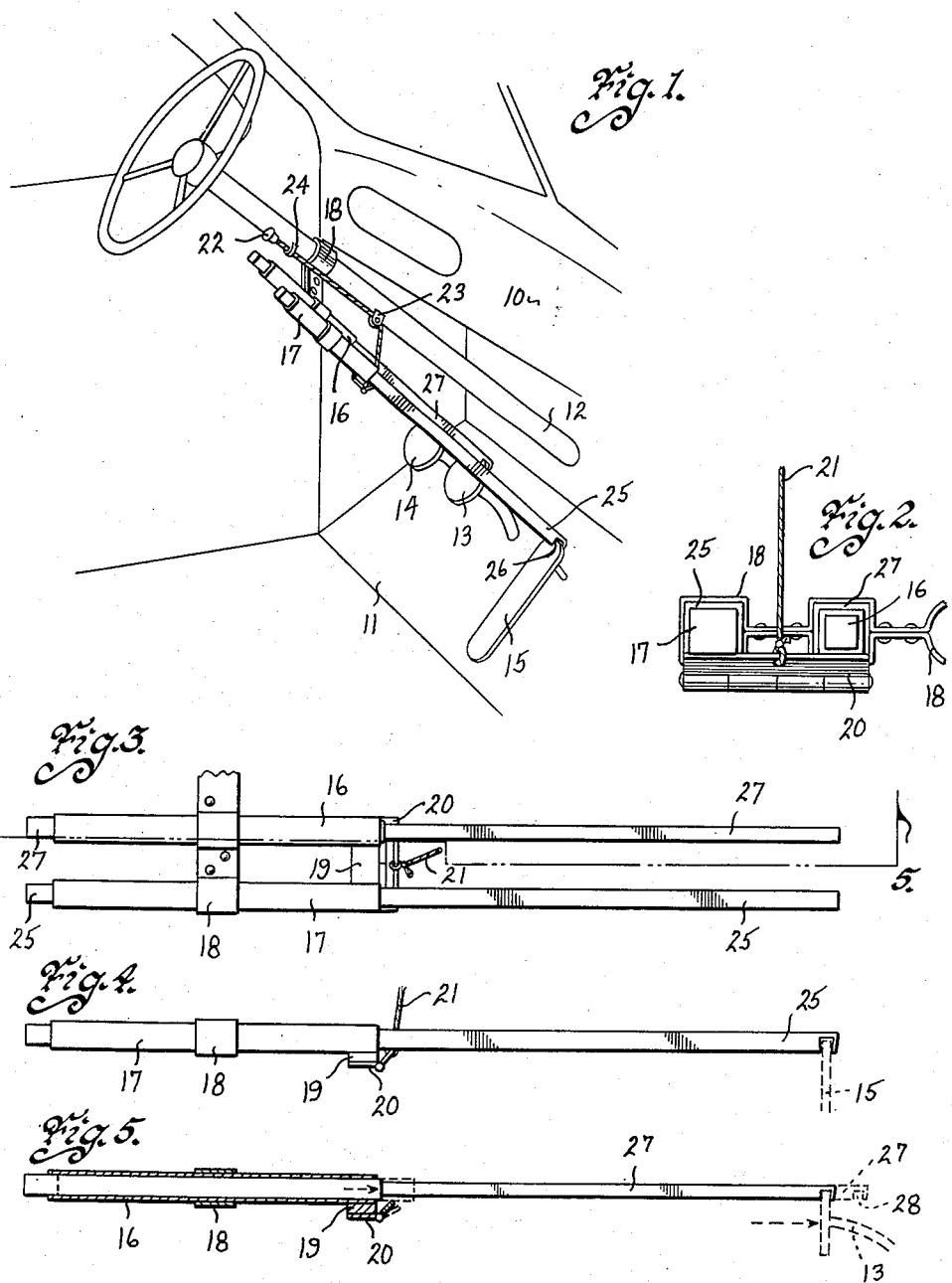

Patented Jan. 19, 1954

2,666,510

UNITED STATES PATENT OFFICE 2,666,510

ADJUSTABLE GOVERNOR FOR ACCELERATORS

Stephen S. Pokorny, Maquoketa, Iowa

Application September 14, 1951, Serial No. 246,613

5 Claims. (Cl. 192—3)

My invention relates to governors for accelerators on automotive vehicles.

Many persons when engaged in driving a motor vehicle for long periods at a time, experience a fatigue and stiffness in their legs and particularly in the right leg which is used to hold the accelerator pedal depressed, and consequently cannot be rested or flexed elsewhere on the floorboard without interrupting the smooth operation of the vehicle. Hand controlled accelerators can be set so the foot is not used, but in case of a sudden need to use either the brake or accelerator pedal, the hand control continues the motor at the set speed, unless manually released. This requires action independently of the foot action and in case of emergency is very likely to be overlooked.

In addition to the element of fatigue from long periods of driving, some persons when so engaged find themselves unable to hold the accelerator pedal at a set position. They are inclined to vary the foot pressure on the pedal at times so that on a long unobstructed drive the car will develop a slight rocking motion from the intermittent depression and release of the accelerator, even though it be very slight.

It is therefore the general aim of my invention to provide a manually operated means for holding the foot accelerator of a motor vehicle at any speed which the operator selects, so that once this control is set, the vehicle motor will operate at a constant speed without use of the foot accelerator pedal.

A further object of my invention is to provide a governor for an accelerator of the above class that is controllable from the seating compartment of a vehicle.

Still another object of this invention is to provide an accelerator control having the above characteristics that can be easily and quickly applied or released.

Still another object of this invention is to provide an accelerator governor as above set forth that is operatively associated with both the foot accelerator and foot brake pedal of an automobile so that once it has been set to hold the accelerator pedal at any set speed, the operation of either the foot accelerator or the foot brake will immediately release this governor from operation.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of the interior of an automobile showing the steering wheel and column, brake and clutch pedal, and foot accelerator and showing my invention associated therewith, Fig. 2 is an enlarged front view of this governor, Fig. 3 is a top plan view of my invention, Fig. 4 is a side view of this device showing the foot accelerator in dotted lines, and Fig. 5 is a view partly in section taken on the line 5—5 of Fig. 3 and showing the foot brake pedal in dotted lines.

Referring to the drawings I have shown the interior of an automobile in front of the driver's seat with the dashboard 10, floor board 11, steering column 12, foot brake pedal 13, clutch pedal 14 and foot accelerator 15 located in a conventional arrangement in order to more fully illustrate the use of my invention. The clutch pedal 14 which is absent on vehicles with automotive transmissions is immaterial to the operation of my accelerator control.

The numerals 16 and 17 designate two elongated hollow housings, preferably of like size and length, that are arranged with their longitudinal axes parallel (Fig. 3) and are secured together by the clamp 18. This clamp extends outwardly from the housing 16 (Fig. 1) and the free end thereof is adapted to be detachably secured to the steering column 12 of a motor vehicle. Thus arranged, the housings 16 and 17 extend in the same general plane as the steering column but are considerably shorter than the column 12. A bar or plate member 19 joins the forward ends of the housings 16 and 17 on the under side thereof and serves to support a hinge 20 which has one side secured thereto as shown in Figs. 4 and 5. The other portion of the hinge is freely movable in a vertical arc and will normally rest in a downward position due to gravity. A flexible member 21 such as a cable or the like is secured at one end to the forward edge of the movable portion of the hinge and its other end extends to a point convenient to the vehicle operator and is provided with a knob handle 22. Preferably the intermediate portion of the cable 21 is reeved over a pulley 23 that is secured to the steering column 12 and is supported near the knob 22 by the eye bracket 24 that is also secured to the column 12 as shown in Fig. 1. Thus arranged, a rearward pull on the handle 22 will pull the free portion of the hinge upwardly.

An elongated operating rod or bar 25 has a notch 26 at one end. The notch is adapted to frictionally embrace the forward edge of the foot accelerator 15 and the other end of this bar 25 extends into the housing 17 and is slidable therein. This bar should be of sufficient length so that when the pedal 15 is fully depressed, it will not be withdrawn from the housing. A second operating rod or bar 27 has a notch 28 similarly located as notch 26 and is arranged on the foot brake pedal 13 and within the housing 16 in the same manner as described for the bar 25. It is to be observed that while I have shown the bars 25 and 27 as frictionally secured directly to the pedals 13 and 15 respectively, that this is but one illustration of describing my invention and that any suitable method of operatively associating these operating bars with the accelerator and foot brake would not change the principle of my invention. Also as is clearly shown in Figures 2 and 3, the upper portion of rod 27 is larger than the portion below housing 16 when the brake pedal is in the normal or "up" position.

In operation, my invention will function as follows. The foot accelerator 15 is depressed in its usual manner and this will cause the rod 25 to move downwardly through the housing 17. With the vehicle operating at a speed that the operator wishes to maintain for an extended period, the knob 22 is pulled upwardly. This raises the movable portion of the hinge 20 so that the free end thereof will wedge or bind against the underside of rod 25. The hinge is also placed in the path of a longitudinal projection of the upper portion of rod 27. In this position, the usual return spring on the accelerator 15 is inadequate to overcome the holding force of the wedge action described and consequently the pedal 15 will remain at the position it had when the hinge was wedged. The operator is then free to place his right leg in the most comfortable position.

The release of this control on the accelerator is accomplished by depressing either the accelerator or the foot pedal. Since the hinge is wedged against bar 25 or may be struck by bar 27, a downward and forward movement of either bar will force the hinge 20 out of its wedged position (Fig. 5) and as the accelerator returns spring is the only force holding the hinge and rod 25 in engagement with each other, gravity will cause the hinge to drop so as not to interfere with the free movement of either bar. This makes it possible to apply the brakes without any independent action required relative to the accelerator for as soon as the brake is depressed, the larger portion of rod 27 strikes the hinge and it falls free and the accelerator pedal automatically returns to its off position. Likewise, if greater acceleration is desired as for passing another vehicle, the depression of the accelerator releases this governor and it will not function further until the knob 22 is again pulled as described.

The effect of this invention is to add considerably to the comfort of the vehicle operator on long drives as it is no longer necessary to keep the right leg constantly on the accelerator. And even though the accelerator is in a controlled position, the manner of its release eliminates the obvious disadvantages that would result if the usual hand accelerator were set and not manually released in case of an emergency. The application of brakes or a further depression of the foot accelerator is more or less an instinctive act for the ordinary driver and since either of these acts releases my governor, its operation requires no attention other than initially placing it in operation when desired.

Some changes may be made in the construction and arrangement of my adjustable governor for accelerators without departing from the real spirit and purpose of my invention, and it is my intention to cover by my claims, any modified forms of structure or use of mechanical equivalents which may be reasonably included within their scope.

I claim:

1. In an adjustable governor for accelerators on vehicles having accelerator and brake pedals, a frame adapted to being secured to a vehicle, a pair of rods slidably mounted in said frame, a hinge secured to said frame below said rods, means for securing one of said rods to the accelerator pedal of a vehicle, means for securing the other of said rods to the brake pedal of a vehicle, and a manual means for hingedly moving a portion of said hinge into frictional engagement with the one of said rods that is adapted to being secured to the accelerator pedal of a vehicle; said hinge being otherwise free to fall away from said rods under the influence of gravity; said hinge having its hinge point closer to said rods than the length of the free hinge side.

2. In an adjustable governor for accelerators on vehicles having accelerator and brake pedals, a frame adapted to being secured to a vehicle, pair of rods slidably mounted in said frame and being adjacent to each other at at least one point of each of their respective lengths, a hinge secured by one of its sides to said frame at a point adjacent to the point on said rods where they are adjacent to each other; the free side of said hinge when moved hingedly upwardly engaging at least one of said rods at an angle whereby further movement of said one rod after it engages said hinge free edge is restricted by the wedging action of said hinge, means for securing said one rod to the accelerator pedal of a vehicle, means for securing the other of said rods to the brake pedal on a vehicle, a manual means for hingedly moving the free side of said hinge upwardly and into contact with said one rod, and means on the other of said rods for engaging said hinge to push it away from said one rod.

3. In an adjustable governor for accelerators on vehicles having spring loaded accelerator and brake pedals, a frame adapted to being secured to a vehicle, a pair of substantially straight rods slidably mounted in said frame, a means for operatively securing one of said rods to the vehicle brake pedal, a means for operatively securing the other of said rods to the accelerator pedal of said vehicle, a hinge secured to said frame below said rods by one of its sides; the hinge point of said hinge being closer to the bottom of the other of said rods than the distance from the hinge point to the free edge of the other side of said hinge, and a manual means for raising the free side of said hinge to bring its edge into contact with the other of said rods; the free side of said hinge being held in engagement with said other rod by their frictional engagement with each other and the spring load of the accelerator pedal to which it is secured.

4. In an adjustable governor for accelerators on vehicles having accelerator and brake pedals, a frame adapted to being secured to a vehicle, a pair of substantially straight rods slidably mounted in said frame, a means for operatively securing one of said rods to the vehicle brake pedal, a means for operatively securing the other of said rods to the accelerator pedal of said vehicle, a hinge secured to said frame below said rods by one of its sides; the hinge point of said hinge being closer to the bottom of the other of said rods than the distance from the hinge point to the free edge of the other side of said hinge, a shoulder on said one rod secured to said one rod at a point adjacent to said hinge when said one rod is in the position it assumes when it is secured to a vehicle brake pedal that is in the off position.

5. In an adjustable governor for accelerators on vehicles having accelerator and brake pedals, a frame adapted to being secured to a vehicle, pair of rods slidably mounted in said frame and being adjacent to each other at least one point of each of their respective lengths, a hinge secured by one of its sides to said frame at a point adjacent to the point on said rods where they are adjacent to each other; the free side of said hinge when moved hingedly, engaging at least one of said rods at an angle whereby further movement of said one rod after it engages said hinge free edge is restricted by the wedging action of said hinge, means for securing said one rod to the accelerator pedal of a vehicle, means for securing the other of said rods to the brake pedal on a vehicle, a manual means for hingedly moving the free side of said hinge into contact with said one rod, and means on the other of said rods for engaging said hinge to push it away from said one rod; the hinge point of said hinge being positioned as to be arranged at a higher level than the edge of the free side of said hinge when it is engaged in a wedging action with said one rod.

STEPHEN S. POKORNY.

References Cited in the file of this patent

UNITED STATES PATENTS

| Number | Name | Date |
|---|---|---|
| 980,008 | Romines | Dec. 27, 1910 |
| 1,372,456 | Roetter | Mar. 22, 1921 |
| 1,404,785 | Michon | Jan. 31, 1922 |
| 1,584,013 | Collins | May 11, 1926 |
| 1,681,380 | Taman | Aug. 21, 1928 |
| 1,707,113 | Christ | Mar. 26, 1929 |
| 1,906,366 | Burns | May 2, 1933 |
| 2,033,821 | Ellery | Mar. 10, 1936 |
| 2,165,897 | Liley | July 11, 1939 |
| 2,167,843 | Johnson | Aug. 1, 1939 |
| 2,258,007 | Gonderman | Oct. 7, 1941 |
| 2,318,931 | Diver | May 11, 1943 |
| 2,568,481 | Bianca | Sept. 18, 1951 |